Jan. 7, 1964
H. P. HARLE
3,116,615
HOUSEHOLD REFRIGERATOR INCLUDING REMOVABLE UNITARY REFRIGERATING SYSTEM
Filed Nov. 21, 1962
2 Sheets-Sheet 1
FIG. 1
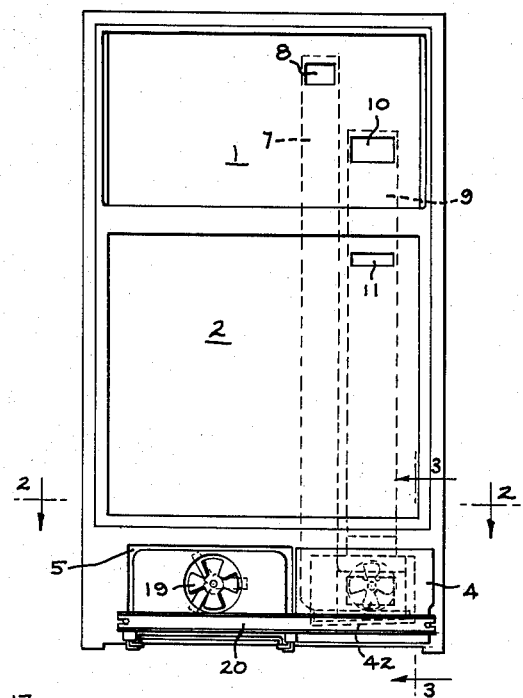
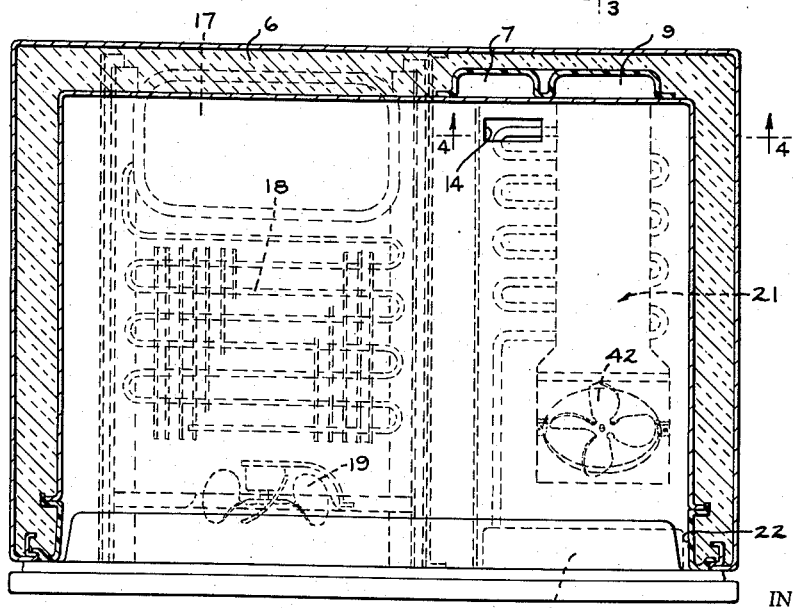
FIG. 2
INVENTOR.
HAROLD P. HARLE
BY
HIS ATTORNEY

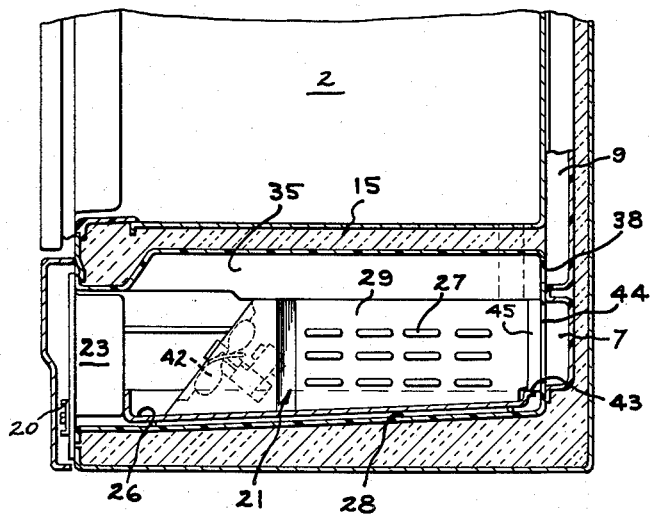
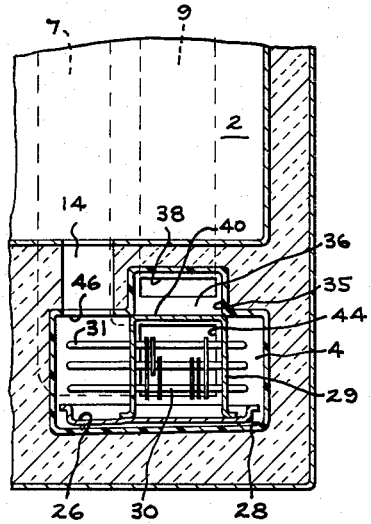
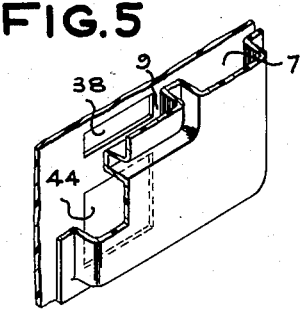

United States Patent Office 3,116,615
Patented Jan. 7, 1964

3,116,615
HOUSEHOLD REFRIGERATOR INCLUDING REMOVABLE UNITARY REFRIGERATING SYSTEM
Harold P. Harle, Louisville, Ky., assignor to General Electric Company, a corporation of New York
Filed Nov. 21, 1962, Ser. No. 239,164
4 Claims. (Cl. 62—283)

The present invention relates to household refrigerators of the type in which an above freezing and a below freezing storage compartment are cooled by air circulated over an evaporator positioned outside the compartments and is more particularly concerned with a refrigerator of this type including a removable unitary refrigerating system for cooling and conditioning the circulated air.

There are presently available a number of different types of household refrigerators in which both an above freezing or fresh food storage compartment and a below freezing or freezer storage compartment are maintained at their desired operating temperatures by air circulated from the two compartments over a single evaporator positioned outside or separate from the storage compartments. The single evaporator is operated at or below the temperature desired in the freezer compartment and the different temperatures of the two compartments are obained by circulating a relatively large volume of cooled air through the freezer compartment and a relatively small volume of cooled air through the fresh food compartment. Due to the higher temperature maintained in the fresh food compartment and the relatively frequent number of fresh food door openings, the air stream returning to the evaporator from the fresh food compartment contains a substantial amount of moisture. If all or a substantial part of the freezer return air is mixed with this moisture laden fresh food return air prior to passage of the combined air streams over the evaporator, it has been found that the moisture in the combined streams tends to deposit on the evaporator in the form of a fluffy frost which rather quickly restricts the air flow through the evaporator. Under high ambient temperature and humidity conditions, the fast accumulation of the fluffy frost may cause the fresh food and freezer compartment temperatures to rise above tolerable limits even though the evaporator is defrosted between each "on" or refrigerating cycle.

To avoid this unsatisfactory performance, it is desirable that the moisture contained in the fresh food air returning to the evaporator compartment be removed therefrom before that air is mingled or mixed with the return freezer air and the present invention has as its principal object the provision of a household refrigerator including a removable refrigerating unit so constructed and arranged as to maintain the two air streams separate until the moisture is removed from the fresh food returned air.

Another object of the present invention is to provide a household refrigerator including a fresh food storage compartment, a freezer compartment and a separate evaporator compartment containing a removable evaporator unit, the evaporator compartment and evaporator unit being a simple and compact construction and designed to prevent the return fresh food and freezer air streams from intermingling or intermixing prior to removal of the moisture from the fresh food air stream.

A further object of the invention is to provide a household refrigerator including an upper freezer compartment, a fresh food compartment below the freezer compartment, an evaporator compartment positioned below the fresh food compartment and an improved air circulating and cooling system for maintaining the two storage compartments at their desired operating temperatures.

Further objects and advantages of the present invention will become apparent as the following description proceeds and the features of novelty which characterize the invention will be pointed out with particularity in the claims annexed to and forming part of this specification.

In accordance with a preferred embodiment of the present invention, there is provided a household refrigerator including a freezer storage compartment at the top of the cabinet, a fresh food or above freezing storage compartment below the freezer compartment and an insulated evaporator compartment below and separate from the storage compartments. The evaporator compartment is designed to receive an evaporator unit forming part of a unitary refrigerating apparatus which also includes a condensing unit. A blower or equivalent fan means is provided for withdrawing air from both of the storage compartments and circulating it over the evaporator unit for cooling the air after which the cooled air is circulated through the two compartments. The evaporator compartment and the removable evaporator unit are designed to provide a simple and effective means for maintaining the air streams returning from the fresh food and the freezer compartments to the evaporator compartment separate until such time as the moisture content of the fresh food return air has been removed by a frost collecting portion of the evaporator. To this end the evaporator is divided by means of a housing into a frost collecting portion and a cooling portion, the latter portion being contained within the housing. The top wall of the housing, in cooperation with a recess provided in the top wall of the evaporator compartment, provides a closed passageway for preventing freezer return air entering the recess from mingling with the fresh food return air until after the fresh food return air has passed over the frost collecting portion of the evaporator.

In a specific embodiment, the invention also includes a single duct extending vertically through the rear wall of the insulating wall of the cabinet which provides both a passage for returning freezer air to the evaporator compartment and means for delivering a portion of the freezer return air to the fresh food compartment for maintaining that compartment at the desired above freezing temperature.

For a better understanding of the invention, reference may be had to the accompanying drawing in which:

FIGURE 1 is a front elevation, with the closure members removed, of a household refrigerator including what is presently considered to be a preferred embodiment of the present invention;

FIGURE 2 is a horizontal sectional view taken generally along 2—2 of FIGURE 1;

FIGURE 3 is a vertical sectional view taken generally along line 3—3 of FIGURE 1;

FIGURE 4 is a vertical sectional view taken generally along line 4—4 of FIGURE 2; and FIGURE 5 is a detailed perspective view of a portion of the air flow system adjacent the evaporator compartment.

Referring to FIGURE 1 of the drawing, there is shown a refrigerator cabinet including insulating walls defining a freezer compartment 1 positioned at the top of the cabinet and a fresh food compartment 2 positioned below the freezer compartment. An evaporator compartment 4 and a condensing unit compartment 5 are arranged in side-by-side relationship along the bottom portion of the cabinet below the fresh food compartment. For clarity, the closure members for closing the access openings to the storage compartments 1 and 2 and the decorative grille or plate for covering the lower face portion of the cabinet have been omitted from FIGURE 1.

Cooled air from the evaporator compartment is circulated through the two storage compartments 1 and 2 by an air flow system including ducts or passages generally contained within the rear wall 6 of the cabinet. More specifically cooled air is conveyed directly to the freezer storage compartment 1 through a duct 7 extending upwardly through the insulated space of the rear wall 6 and this duct has an outlet 8 in the rear wall of the freezer compartment 1. Return air is withdrawn from the freezer compartment and returned to the evaporator compartment through a duct 9 having an inlet 10 in the rear wall of the freezer compartment 1. This return duct also has an outlet opening 11 in the rear wall of the fresh food compartment 2 through which a portion of the return low temperature air from the freezer compartment is introduced into the fresh food compartment to maintain that compartment at the desired above freezing operating temperatures. The air passing through the fresh food compartment is returned to the evaporator compartment through a passageway 14 provided in the insulated partition 15 separating the fresh food compartment 2 from the evaporator compartment 4 and the condensing unit compartment 5.

The removable unitary refrigerating apparatus for refrigerating the air supplied to the storage compartments 1 and 2 comprises a condensing unit positioned in compartment 5 and including a compressor 17, a condenser 18 and a fan 19 which is arranged to pass a cooling stream of air over the condenser and compressor. The condensing unit is adapted to be inserted into the condensing unit compartment 5 through the front of the cabinet. The usual controls such as defrost timing means, valves, and other electrical control equipment normally forming parts of an automatic defrost refrigerating system positioned outside of the refrigerated compartments or in other words at ambient temperatures are also included in the condensing unit component of the apparatus housed within the compartment 5.

Connected to the condensing unit by means of a suitable frame work generally indicated by the numeral 20 in FIGURE 1 is an evaporator unit 21 arranged to be inserted into the evaporator compartment 4 through an opening 22 in the face of the cabinet. The evaporator unit includes an insulating plug 23 fastened directly to the frame work 20 and designed to close the access opening 22 to the evaporator compartment 4. Mounted on the inner face of the plug 23 is a drip pan 26 which also serves to support an evaporator generally indicated by the numeral 27. The drip pan is adapted to rest on the bottom wall 28 of the evaporator compartment when the unit is placed within that compartment.

As illustrated more clearly in FIGURE 4 of the drawing, the evaporator, which comprises a length of tubing folded to provide a plurality of horizontal passes, occupies approximately the rear half of the evaporator compartment 4. It is divided by means of a housing 29 and the drip pan into a cooling portion 30 which is generally contained within the housing 29 and a frost collecting portion 31 which is outside and to one side of the housing 29. For maximum cooling capacity, the cooling portion 30 of the evaporator preferably includes a plurality of relatively closely spaced fins for good heat transfer between the air circulated over this portion of the evaporator and the evaporator surfaces. The frost collecting portion 31 on the other hand contains a relatively few widely spaced fins or, if desired, the fins may be completely omitted from this portion of the evaporator in order to provide a substantial space for the collection of frost without seriously interfering with the air flow through this portion of the evaporator.

While for purposes of clarity, suitable defrost means have been omitted from the drawing, it will be understood that the evaporator 27 also includes electrical or hot refrigerant gas heating means for periodically warming the evaporator to an above freezing temperature so that the frost collected thereon and particularly on the frost collecting portion 31 can be removed. The defrost water collects in the pan 26 and is conducted by suitable conduits (not shown) to an evaporator pan positioned in heat exchange relationship with the compressor 17 or condenser 18.

In accordance with the present invention, the evaporator unit 21 or more specifically the walls of the housing 29 and the walls defining the evaporator compartment 4 are so constructed and arranged that the fresh food compartment return air returning to the rear portion of the evaporator compartment through the passage 14 and the freezer compartment return air returning to the evaporator compartment through the duct 9 in the back wall of the cabinet are prevented from intermingling until after the fresh food air has passed over and has been dehydrated by the frost collecting portion 31 of the evaporator. To this end, the evaporator compartment includes a recess 35 in the top wall thereof extending from the rear wall 36 of the evaporator compartment forwardly to a point adjacent the front of the evaporator compartment and the freezer return air duct 9 has its outlet 38 opening into this recess. The housing 29 includes a top wall 40 which has a width at least equal to the width of the recess 35 and this wall 40 is arranged to be in substantial engagement with the top wall portions of the evaporator compartment on each side of the recess 35 so as to form a closed tunnel or passage above the top wall 40 of the housing which is in effect a continuation of duct 9. Thus the freezer return air entering the evaporator compartment through the outlet 38 is conducted forwardly through that tunnel into the front of the evaporator compartment 4.

For the purpose of establishing air flow between the evaporator and storage compartments, there is provided a fan 42 at the front of the housing 21. The fan draws air from the front of the evaporator compartment into the housing where it passes over the cooling portion of the evaporator and is then discharged through the open rear end 43 of the housing into the supply duct 7 having its inlet 44 in the rear wall of the evaporator compartment opposite the rear end of the housing and below outlet 38. A sealing gasket 45 carried by the evaporator housing serves to seal the area around the inlet 44. The fan 42 also serves to withdraw air from the fresh food compartment 4 through the passage 14 opening into the evaporator compartment through the inlet 46 which is to one side of the recess 35. The adjacent evaporator compartment walls and the housing cause this moisture laden air to pass over the defrost portion 31 of the evaporator before it becomes mingled with the freezer return air at the front of the compartment 4 after which the mixed air streams are passed over the cooling portion 30 of the evaporator.

The construction of the duct system adjacent the rear of the evaporator compartment 4 is shown in greater detail in FIGURE 5 of the drawing. It will be noted that the duct 7 has a right angle bend at the lower portion thereof whereby the inlet end of this duct extends beneath the duct 9 for communication with the inlet 44 at the rear of the evaporator compartment 4. Duct 9 extends vertically above inlet 38.

The air entering the duct 7 through the evaporator compartment outlet 44 passes upwardly and the entire flow of air is discharged through the opening 8 into the freezer compartment 1. Most of the air withdrawn from the freezing compartment 1 through the opening 10 flows downwardly through the duct 9 and directly to the front of the evaporator compartment through the inlet 38 and the recess 35. A small portion of this air is bled off through the supply opening 11 into the fresh food compartment 2, the amount of air so supplied determining the operating temperature of the fresh food compartment 2. The moisture laden air withdrawn from the fresh food compartment to the return duct or passage 14 completes the air flow cycle. It will be noted that the same duct, that is duct 9, is employed both for returning freezer air to the evaporator compartment and for conducting some of the air from the freezer compartment to the fresh food compartment 2.

While there has been shown and described a particular embodiment of the present invention, it will be understood that the invention is not limited thereto and it is intended by the appended claims to cover all such changes and modifications as come within the true spirit and scope of the invention.

What I claim as new and desire to secure by Letters Patent of the United States is:

1. A household refrigerator cabinet including insulated walls defining an above freezing storage compartment, a below freezing storage compartment and an evaporator compartment separate from said storage compartments, said evaporator compartment having a recess in the top wall thereof extending forwardly from the rear wall of said evaporator compartment, a removable evaporator in said evaporator compartment, an open ended housing enclosing a portion of said evaporator and dividing said evaporator into a cooling portion within said housing and a frost collecting portion outside said housing, air circulating means connecting said storage compartments to said evaporator compartment including a first air return passage in the back wall of said cabinet extending from said below freezing compartment and having its outlet in said recess, a second air return passage from said above freezing compartment opening into said evaporator compartment adjacent the rear part of said frost collecting portion, and an air supply passage in the back wall of said cabinet and having its inlet communicating with the rear end of said housing, a fan for circulating return air into the front end of said housing, the top wall of said housing closing the open side of said recess to provide a passage conducting the air stream flowing from said first return passage forwardly to the front end of said housing.

2. A houshold refrigerator including insulated walls defining an above freezing storage compartment, a below freezing storage compartment and an evaporator compartment separate from said storage compartments, said evaporator compartment having a recess in the top wall thereof extending forwardly from the rear wall of said evaporator compartment, a removable evaporator in said evaporator compartment, a housing enclosing a portion of said evaporator and dividing said evaporator into a cooling portion within said housing and a frost collecting portion outside said housing, air circulating means connecting said storage compartments to said evaporator compartment including a first air return passage from said below freezing compartment having its outlet in said recess, a second air return passage from said above freezing compartment opening into said evaporator compartment adjacent the rear part of said frost collecting portion, an air supply passage having its inlet communicating with the rear end of said housing and a fan for circulating return air into the front end of said housing, the top wall of said housing closing the open side of said recess to direct the air stream flowing from said first return passage forwardly to the front end of said housing and thereby preventing mingling thereof with the air stream from said second return passage prior to passage thereof over said frost collecting evaporator portion.

3. A household refrigerator comprising insulated walls including a back wall and defining an upper freezer compartment, an intermediate fresh food compartment and a lower evaporator compartment, said evaporator compartment including insulated side, top, bottom and rear walls and having an access opening at the front thereof, said top wall having a recess therein extending forwardly from the rear wall of said evaporator compartment, a removable evaporator unit in said evaporator compartment, said unit including a defrostable evaporator and a housing including top and side walls dividing said evaporator into a cooling portion enclosed within said housing and a frost collecting portion outside said housing, means in said back cabinet wall defining a first air return passage connecting said freezer compartment with said evaporator compartment and having its outlet within said recess, means defining a second air return passage connecting said fresh food compartment with said evaporator compartment and having its outlet in the top wall of said evaporator compartment for directing air issuing from said second air return outlet onto the rear part of the frost collecting portion of said evaporator, an air supply passage for supplying cooled air to said compartments and having its inlet in the rear wall of said evaporator compartment, said housing having front and rear openings, said rear opening being connected to said inlet, fan means mounted in said front opening for circulating return air through said housing, said housing top wall and said recess forming a substantially closed passage for conducting return air from said first air return passage outlet forwardly to the front portion of said evaporator compartment.

4. A household refrigerator comprising insulated walls including a back wall and defining a freezer compartment, a fresh food compartment and an evaporator compartment, said evaporator compartment including insulated side, top, bottom and rear walls and having an acess opening at the front thereof, said top wall having a recess therein extending forwardly from the rear wall of said evaporator compartment, a removable evaporator unit in said evaporator compartment, said unit including a defrostable evaporator and a housing including top and side walls defining said evaporator into a cooling portion enclosed within said housing and a frost collecting portion outside said housing, means in said back cabinet wall defining a first air return passage connecting said freezer compartment with said evaporator compartment and having its outlet within said recess, means defining a second air return passage connecting said fresh food compartment with said evaporator compartment and having its outlet in the top wall of said evaporator compartment for directing air issuing from said second air return outlet onto the rear part of the frost collecting portion of said evaporator, an air supply passage for supplying cooled air to said freezer compartment and having its inlet in the rear wall of said evaporator compartment, said housing having a rear opening connected to said supply passage inlet, fan means at the front of said housing for circulating return air into said housing, said housing top wall and said recess forming a substantially closed passage for conducting return air from said first air return passage outlet forwardly to the front portion of said evaporator compartment, and means connecting said first air return passage with said fresh food compartment for conducting a portion of the air in said passage into said fresh food compartment.

References Cited in the file of this patent
UNITED STATES PATENTS

| | | |
|---|---|---|
| 3,000,186 | Mann | Sept. 19, 1961 |
| 3,027,732 | Mann | Apr. 3, 1962 |